US010167783B2

(12) United States Patent
Collopy et al.

(10) Patent No.: US 10,167,783 B2
(45) Date of Patent: Jan. 1, 2019

(54) LOW PRESSURE COMPRESSOR VARIABLE VANE CONTROL FOR TWO-SPOOL TURBOFAN OR TURBOPROP ENGINE

(75) Inventors: Gary Collopy, Vernon, CT (US); Matthew R. Feulner, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1857 days.

(21) Appl. No.: 13/415,912

(22) Filed: Mar. 9, 2012

(65) Prior Publication Data
US 2013/0236296 A1  Sep. 12, 2013

(51) Int. Cl.
*F01D 17/00* (2006.01)
*F02C 9/20* (2006.01)
*B23P 17/00* (2006.01)

(52) U.S. Cl.
CPC ........... *F02C 9/20* (2013.01); *Y10T 29/49229* (2015.01)

(58) Field of Classification Search
CPC .......... F02C 9/20; F01D 17/08; F01D 17/085; F01D 17/16; F01D 17/162; F05D 2270/07; F05D 2270/20; F05D 2270/301; F05D 2270/303; F05D 2270/3061; F05D 2270/44; F05D 2270/60
USPC ....... 415/1, 17, 51, 129, 130, 141, 146, 148, 415/149.2, 149.4, 159–162, 208.1, 208.2, 415/209.1, 209.3
See application file for complete search history.

(56) References Cited

U.S. PATENT DOCUMENTS

| 5,044,879 | A | 9/1991 | Farrar |
| 5,133,182 | A | 7/1992 | Marcos |
| 6,887,035 | B2 | 5/2005 | Bruce |
| 7,143,584 | B2 * | 12/2006 | McKelvey et al. ............. 60/778 |
| 7,826,954 | B2 * | 11/2010 | Muramatsu et al. ......... 701/100 |
| 8,092,157 | B2 | 1/2012 | McCaffrey |
| 8,649,954 | B2 * | 2/2014 | Boyer et al. .................. 701/100 |
| 2004/0240989 | A1 * | 12/2004 | Willshee et al. .............. 415/148 |
| 2007/0020090 | A1 | 1/2007 | Giaimo et al. |
| 2007/0020091 | A1 | 1/2007 | Giaimo et al. |
| 2007/0020092 | A1 | 1/2007 | Giaimo et al. |
| 2007/0020093 | A1 | 1/2007 | Giaimo et al. |
| 2009/0056306 | A1 | 3/2009 | Suciu et al. |
| 2009/0097966 | A1 | 4/2009 | McCaffrey |
| 2009/0104022 | A1 | 4/2009 | Suljak, Jr. et al. |
| 2009/0162192 | A1 | 6/2009 | McCaffrey et al. |

(Continued)

FOREIGN PATENT DOCUMENTS

WO  WO 2011/042636 A1  4/2011

*Primary Examiner* — Richard Edgar
*Assistant Examiner* — Alexander White
(74) *Attorney, Agent, or Firm* — Cantor Colburn LLP

(57) ABSTRACT

A system and a method for adjusting an angle of at least one stator vane of a low pressure compressor (LPC) of a two spool gas turbine engine is disclosed. Variable stator vanes are rotatably coupled to a stationary case in one of the stages of the LPC. An actuator is coupled to at least one of the variable stator vanes for imparting rotation of the stator vane about a radius of the case. Various coupling or linkage arrangements may be made so that rotation of one vane results in rotation of the other vanes disposed along the case. The controller includes the stored constraints, the ability to estimate operating condition, and the ability to estimate optimum targets.

20 Claims, 2 Drawing Sheets

(56) References Cited

U.S. PATENT DOCUMENTS

| | | |
|---|---|---|
| 2011/0004388 A1 | 1/2011 | Winter |
| 2011/0052370 A1 | 3/2011 | Karpman et al. |
| 2011/0054704 A1 | 3/2011 | Karpman et al. |
| 2011/0203293 A1 | 8/2011 | Glahn |

* cited by examiner

US 10,167,783 B2

LOW PRESSURE COMPRESSOR VARIABLE VANE CONTROL FOR TWO-SPOOL TURBOFAN OR TURBOPROP ENGINE

TECHNICAL FIELD

This disclosure relates to gas turbine engines, and more particularly to dual-spool turbofan or turboprop engines. Still more specifically, this disclosure relates to variable stator vanes of the low pressure compressor (LPC) of such engines and control schemes for such variable stator vanes.

BACKGROUND

Two spool turbofan and turboprop jet engines typically include three sections in the core. The first section is the compressor section, which includes a low pressure compressor (LPC) followed by a high pressure compressor (HPC). A combustor section is disposed between the compressor section and a turbine section, which includes a high pressure turbine (HPT) followed by a low pressure turbine (LPT). The LPT is connected to and drives the LPC via one shaft and the HPT is connected to the HPC via a second shaft.

Turbofan and turboprop engines operate by combusting fuel in air that has been compressed by the LPC and HPC of the compressor section. The combustion takes place in the combustor section to create heated gases with increased pressure and density. The heated gases are used to rotate the HPT and LPT in the turbine section that are used to produce thrust or power. For example, in a turbofan, the heated gases are ultimately forced through an exhaust nozzle at a velocity higher than which inlet air is received into the engine to produce thrust for driving an aircraft. The heated gases also rotate the HPT and LPT, which are used to drive the HPC and LPC respectively, which generate the compressed air necessary to sustain the combustion process.

The compressor (LPC and HPC) and turbine (HPT and LPT) sections of a turbofan or turboprop engine typically comprise a series of stator vane and rotor blade stages. The stator vanes of each stage are positioned in front of a rotor to efficiently direct air flow to the blades of the rotor. In general, the stator vanes redirect the trajectory of the air coming off the rotors of the preceding stage for flow into the next stage.

In the compressors, the stator vanes convert kinetic energy of the moving air into pressure, while, in the turbines, the stator vanes accelerate pressurized air to extract kinetic energy. Turbofan and turboprop efficiencies are, therefore, closely linked to the ability of the engine to efficiently direct air flow within the compressor and turbine sections of the engine. Air flows through the compressor and turbine sections differ at various operating conditions of the engine, with more air flow being required at higher output levels and vice versa.

Variable stator vane assemblies are utilized to improve the performance and operability of the engine. Variable stator vane assemblies typically include variable stator vanes which extend forward of rotor blades. The variable stator vanes are rotatable about substantially radial axes. The orientation of the variable stator vanes varies the attack angle of the vanes in a controlled fashion. This allows the vanes to be realigned to change the impingement angle of compressed air onto the following rotor blades as the operating condition of the engine changes. The position of the vanes may be changed by many different means, including, but not limited to a lever arm attached to an actuator ring on the outside of the compressor case or a gear driven arrangement. Thus, air flow through the engine can be controlled, in part, by using variable stator vanes and variable stator vanes have been used to advantageously control the incidence of air flow onto rotor blades of subsequent compressor stages under different operating conditions.

However, schemes for controlling variable stator vanes are generally lacking. Engines without LPC variable stator vanes modify the stability of the LPC using bleed air, which detracts from the performance and efficiency of the engine.

Therefore, there is a need for a control scheme for altering the positions of the LPC stator vanes that is more flexible than the currently available control schemes and which can be used to advantageously control various operating parameters including overall compressor pressure ratio (i.e., the ratio of the pressure at the aft end of the HPC to the pressure at the forward end of the LPC), compressor corrected air flow, bypass ratio (i.e., the ratio of the air entering the core shroud to the air entering the inlet shroud), engine temperatures, spool speed (rpm), and compressor operating line, while reducing fuel consumption.

SUMMARY OF THE DISCLOSURE

In an aspect, the system for adjusting an angle of at least one stator vane of a low pressure compressor (LPC) of a two spool gas turbine engine is disclosed. The system includes at least one stator vane rotatably coupled to a stationary case and directed inwardly along a radius of the case. The system also includes an actuator coupled to at least one stator vane for imparting rotation to the stator vane about said radius. The actuator is linked to a controller. The controller includes a memory stored with constraints defined by corresponding LPC compressor pressure ratios and LPC compressor corrected air flows. The controller sends a signal to rotate at least one stator vane to alter at least one of the compressor pressure ratio or compressor corrected air flow values to change the current operating condition of the LPC to a target operating condition such that the engine remains within its stability constraint.

In another aspect, a system is disclosed for adjusting an angle of least one stator vane of a low pressure compressor of a two spool gas turbine engine. The disclosed system includes at least one stator vane being rotatably coupled to a circular stationary case and directed inwardly along a radius of the case. The system also includes an actuator coupled to at least one stator vane for imparting rotation to the stator vane about said radius. The actuator is linked to a controller. The controller includes a memory with stability constraints for the LPC stored therein for a plurality of operating conditions. The map includes a stability constraint defined by LPC compressor pressure ratios along a y-axis and LPC compressor corrected air flows along an x-axis. The constraint is disposed below the stall line on the stall map. The controller is programmed to send a signal to rotate at least one stator vane to alter at least one of the compressor pressure ratio or compressor corrected air flow to change a current operating condition of the LPC to a target operating condition that delivers more higher performance but within its stability constraint.

A method is also disclosed for optimizing performance of a two spool gas turbine engine. The engine includes a low pressure compressor (LPC) having at least one stage that includes a ring of stator vanes that are rotatably coupled to and directed radially inward from the case. The ring of stator vanes provides a design space within the low pressure compressor whereby rotating the stator vanes enables the operating conditions of the engine to be optimized as the vanes can be rotated and the operating conditions can be evaluated to ensure that the engine is operating within established operating and temperature constraints.

DETAILED DESCRIPTION

Figure 1:
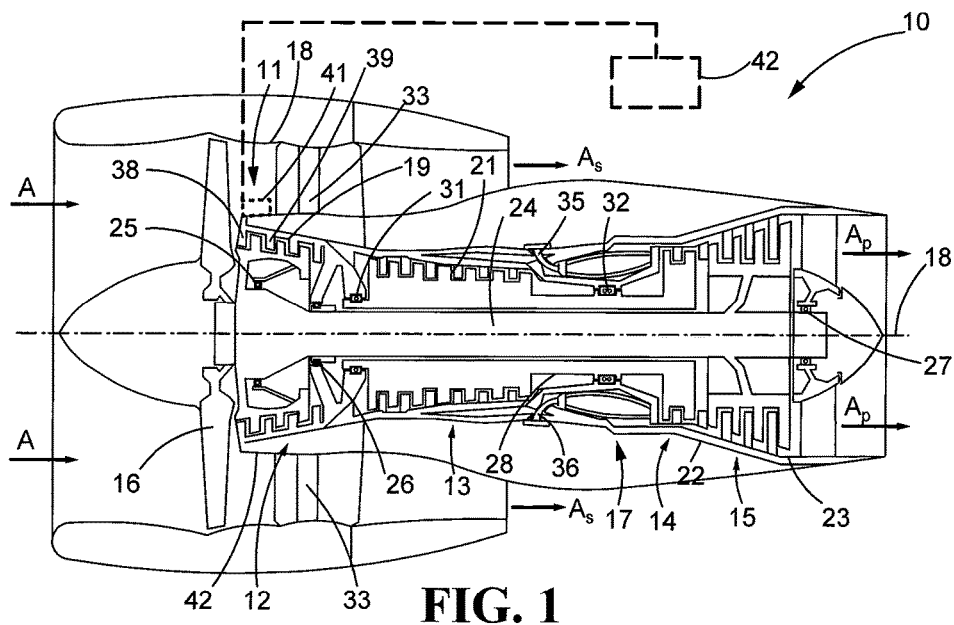
FIG. 1 is a schematic cross-sectional view of a gas turbine engine in which a disclosed variable vane control system may be used.

FIG. 1 shows a schematic cross section of a gas turbine engine 10 which includes a variable vane actuation mechanism 11. In the embodiment shown, the gas turbine engine 10 includes a dual-spool high bypass ratio turbofan engine having a variable vane turbine section that incorporates the actuation mechanism 11. In other embodiments, the gas turbine engine 10 may be another type of gas turbine engine used for aircraft propulsion or power generation, or other systems incorporating variable stator vanes. Although the actuation mechanism 11 is well suited for the low pressure compressor (LPC) 12, the disclosed system is readily applicable to the high pressure compressor (HPC) 13, the high pressure turbine (HPT) 14 as well as the low pressure turbine (LPT) 15.

The operating principals of the gas turbine engine 10 are well known in the art. Briefly, the gas turbine engine 10 includes a fan 16, followed by the LPC 12, HPC 13, combustor section 17, HPT 14, and LPT 15, all of which are disposed about an axis 18 of the engine 10. The fan 16, LPC 12, HPC 13, HPT 14, LPT 15 and other engine components are enclosed at their outer diameters within various engine casings that are disposed within a nacelle or core nacelle (not shown). The fan 16 is disposed within the fan case 18. The LPC 12 is disposed within a LPC case 19; the HPC 13 is disposed within a HPC case 21; the HPT 14 is disposed within a HPT case 22 and the LPT 15 is disposed within an LPT case 23. The fan 16 and LPC 14 are connected to the LPT 22 through the shaft 24, which is supported by the bearings 25, 26 at its forward end and the bearing 27 at its aft end. Together, the fan 16, LPC 12, LPT 15 and shaft 24 collectively form a low pressure spool. HPC 13, is connected to HPT 14 through the shaft 28, which is supported within the engine by the bearings 31, 32. Together, the HPC 13, HPT 14 and shaft 28 form the high pressure spool.

Inlet air A enters the engine 10 whereby it is divided into streams of primary air $A_p$ and secondary air $A_s$ after passing through the fan 16. The bypass ratio is the ratio of the primary $A_p$ over the secondary air $A_s$. The fan 16 is rotated by the low pressure turbine 15 through the shaft 24 to accelerate the secondary air $A_s$ (also known as bypass air) through the exit guide vanes 33, thereby producing a significant portion of thrust output of the engine 10. Primary air $A_p$ (also known as gas path air) is directed first to the LPC 12 and then to the HPC 13. The LPC 12 and HPC 13 work together to incrementally increase the pressure and temperature of the primary air $A_p$. The HPC 13 is rotated by the HPT 14 through the shaft 28 to provide compressed air to the combustor 17. The compressed air is delivered to the combustor 17, along with fuel from the injectors 35, 36, such that a combustion process can be carried out to produce high energy gases necessary to rotate the HPT 14 and LPT 15. Primary air $A_p$ continues through the engine 10 where it is typically passed through an exhaust nozzle to produce additional thrust.

Flow of primary air $A_p$ through the engine 10 is enhanced by the use of variable stator vanes. In particular, LPC 12 includes variable stator vanes 38, which may be disposed between rotor blades 39 or, the rotary vanes 38 may be disposed at the forward stage of the LPC 12 as shown in FIG. 1, thereby placing the rotary stator vanes 38 in front of the rotor blades 39. One or more sets of variable stator vanes 38 may be employed in the LPC 12, HPC 13, HPT 14 or LPT 15 in accordance with this disclosure.

The pitch of the variable vanes 38 may be adjusted by the actuator 41. A variety of means of adjusting the attack angle of the vanes 38 are available and will be apparent to those skilled in the art. Gear mechanisms, lever mechanisms and combinations of the two are available. The variable stator vanes 38 are accommodated within a circular case indicated schematically at 42. The vanes 38 may be rotatably coupled to the case 42 and directed radially inwardly towards the axis 18 or along a radius of the annular case 42. The vanes 38 rotate about their respective radial axes, which extend at least substantially perpendicular to the engine axis 18. When actuated, if multiple variable vanes 38 are involved, the vanes 38 are rotated to adjust the flow of the primary air $A_p$ through the engine 10 for different operating conditions. For example, when the engine 10 undergoes a transient loading such as during a take-off operation, the mass flow of the primary air $A_p$ increases as the engine 10 goes from an idle to a high-throttle operation. As such, the pitch of the variable vanes 38 may be continually altered to among other things, improve air flow and prevent stalling. The actuator 41 for the variable stator vanes 38 is linked to a controller 42 as shown in FIG. 1.

Figure 2:
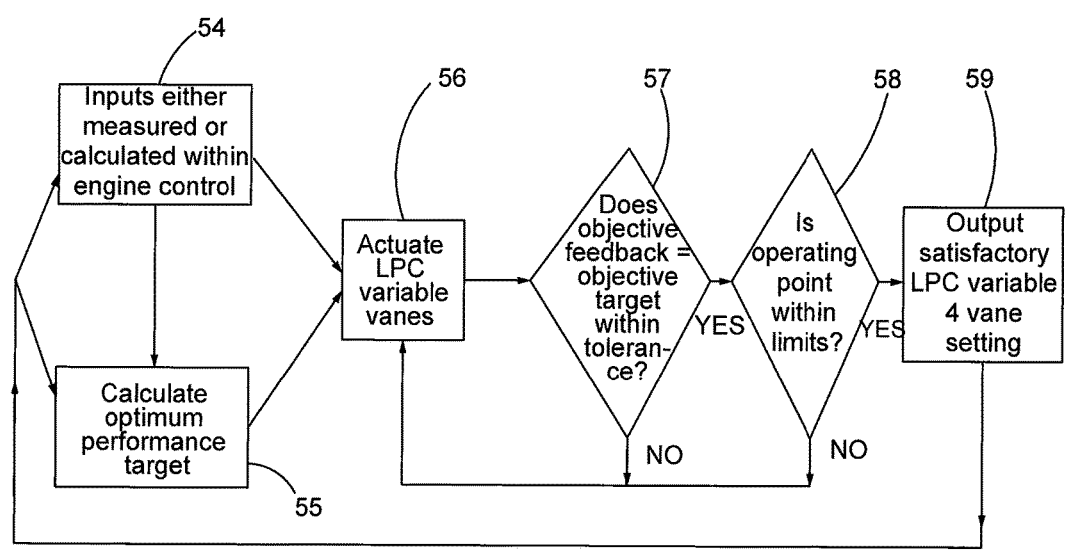
FIG. 2 is a flow diagram of one disclosed control scheme.
Figure 3:
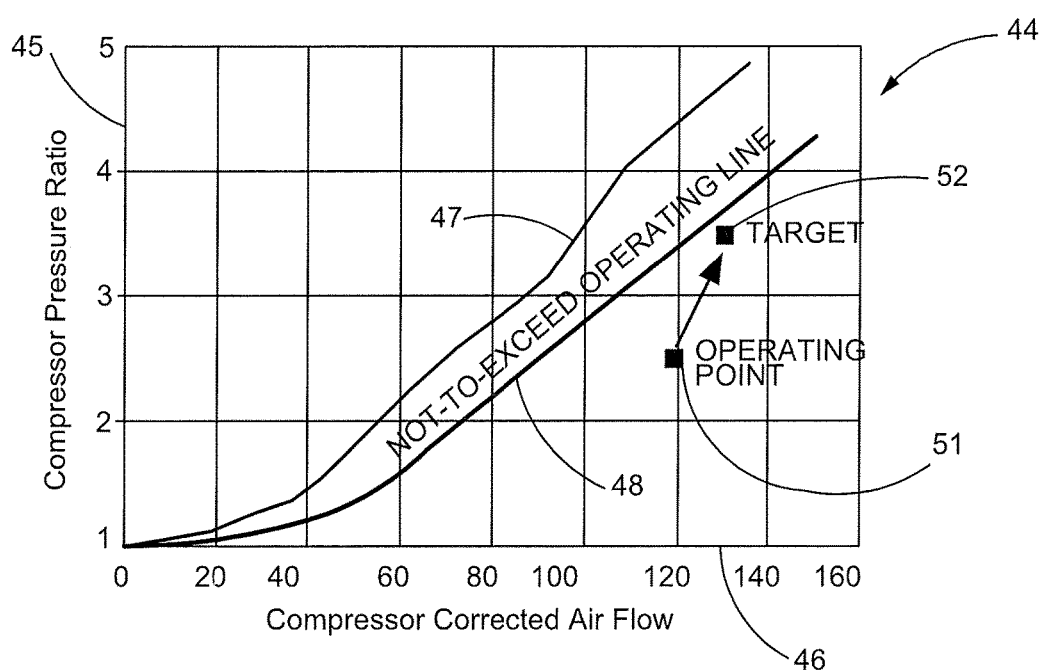
FIG. 3 is a compressor map that graphically illustrates the relationship between compressor pressure ratio and compressor corrected air flow and the changing of the operating conditions to move from a current operating point to a target operating point.

Turning to FIGS. 2-3, the controller 42 includes the ability to know its operating point, limits, and target on the compressor map 44 as shown in FIG. 3. The y-axis 45 of the compressor map 44 represents the compressor pressure ratio, or the ratio of the pressure of the primary air $A_p$ exiting the LPC 12 divided by the pressure of the primary air $A_p$ entering the LPC 12. The x-axis 46 represents the compressor corrected air flow.

The compressor map 44 of FIG. 3 includes two lines or plots 47, 48. The line 47 represents a stall line. That is, compressor pressure ratio/compressor corrected air flow coordinates falling on line 47 or above line 47 may result in the LPC 12 stalling. Below the line 47 is the line 48, which can be considered to be a stability limit line or a "not-to-exceed" operating line. Thus, operating conditions may approach the line 48 without fear of stalling the LPC 12 because of the protective operating margin between the lines 48 and 47. To adjust the operation of the engine 10 from the operating point 51 to the target operating point 52, the method of FIG. 2 is carried out.

Referring back to FIG. 2, various sensors and controllers associated with the engine 10 detect or calculate operating parameters at step 54. The controller 42 may calculate an optimum performance target at step 55 which may or may not be independent from the measurements and calculations carried out in step 54. At step 56, the controller 42 is in communication with the actuator 41 but the actuator 41 has yet to move the adjustable vanes 38. At step 57, the controller 42 determines whether the current operating point 51 (FIG. 3) is sufficiently different or not within tolerance of the target operating point 52. If the operating point 51 is not within the desired tolerance, the controller 42 sends a signal to the actuator 41 and the vanes 38 are adjusted at step 56 before the comparison of step 57 is repeated. Once the current operating point 51 is sufficiently close to the target operative point 52 so as to be within the desired tolerance, the controller 42 determines whether the engine 10 is operating within desired limits at step 58. In other words, at step 58, the controller 42 determines whether the new operating point 51 is above or within the limit line 48 of FIG. 3. Assuming the new operating point 51 is disposed within the limit line 48, the variable vane 38 setting is accepted at step 59 and the process is repeated as a continuous loop.

INDUSTRIAL APPLICABILITY

Thus, a system and a method for adjusting the angle of variable stator vanes of a LPC of a two spool gas turbine engine are disclosed. An actuator is coupled to at least one of the variable stator vanes for imparting rotation to the stator vane to adjust the angle. The stator vane coupled to the actuator may be linked or coupled to the other stator vane in the stage using known linkage, lever or gear mechanisms. The system for adjusting the stator vanes may utilize two or more parameters, including the compressor pressure ratio and the compressor corrected air flow. Sensors and calculations are used to measure the compressor pressure ratio and the compressor corrected air flow to determine the current operating point. If the current operating point is sufficiently different from the closest stall margin value, the controller will command the actuator to rotate the variable vanes to increase the compressor pressure ratio and/or the compressor corrected air flow but not to a point where the desired target operating point is at or beyond limits.

The disclosed control system may be used as original equipment on new engines or may be added as a retrofit to existing turbofan, turboprop or other dual-spool gas turbine engines.

What is claimed is:

1. A system for controlling a low pressure compressor of a gas turbine engine having at least two spools, comprising:
at least one stator vane rotatably coupled to a stationary case and directed inwardly along a radius of the stationary case;
an actuator coupled to the at least one stator vane for imparting rotation to the at least one stator vane about said radius, the actuator linked to a controller;
the controller including a memory stored with a plurality of low pressure compressor corrected airflow values, a plurality of low pressure compressor pressure ratio values, and a plurality of engine operability limit values, each engine operability limit value being associated with a combination of a particular low pressure compressor corrected airflow value and a particular low pressure compressor pressure ratio value, the controller configured to:
receive data concerning a current low pressure compressor air flow and a current low pressure compressor pressure ratio and calculate the low pressure compressor's current operating state;
determine an optimum performance target for the low pressure compressor;
determine whether the low pressure compressor's current operating state is within a tolerance of the optimum performance target and send a signal to the actuator to rotate the at least one stator vane until the current operating state is within the tolerance of the optimum performance target; and
determine whether the low pressure compressor's current operating state is at or below one of the plurality of engine operability limit values stored in memory and send a signal to the actuator the act least one stator vane until the current operating state is at or below the one of the plurality of engine operability limit values stored in memory, while the current operating state is within the tolerance of the optimum performance target.

2. The system of claim 1 wherein the at least one stator vane includes a plurality of stator vanes circumferentially spaced around and rotatably coupled to the stationary case, and wherein the actuator rotates all of the stator vanes disposed along the case simultaneously.

3. The system of claim 1 wherein the controller sends the signal to the actuator to rotate the at least one stator vane to reduce fuel consumption.

4. The system of claim 1 wherein the controller sends the signal to the actuator to rotate the at least one stator vane to reduce engine temperatures.

5. The system of claim 1 wherein the low pressure compressor includes a plurality of stages including a forward stage and an aft stage, each stage includes a plurality of stator vanes coupled circumferentially around a case and a rotor disposed aft of the plurality of stator vanes, the forward stage including the at least one stator vane rotatably coupled to the case and being coupled to the actuator.

6. A turbofan gas turbine engine including the system of claim 1.

7. A turboprop gas turbine engine including the system of claim 1.

8. A gas turbine engine having at least two spools, comprising:
a combustor;
a low pressure compressor upstream of the combustor and including at least one stator vane;
the at least one stator vane rotatably coupled to a circular stationary case and directed inwardly along a radius of the circular stationary case;
an actuator coupled to the at least one stator vane for imparting rotation to the at least one stator vane about said radius, the actuator linked to a controller;
the controller including a memory stored with a plurality of low pressure compressor corrected airflow values, a plurality of low pressure compressor pressure ratio values, and a plurality of engine operability limit values, each engine operability limit value associated to a combination of a particular low pressure compressor corrected airflow value and pressure ratio value, the controller configured to:
receive data concerning a current low pressure compressor air flow and current low pressure compressor pressure ratio and calculate the low pressure compressor's current operating state;
determine an optimum performance target for the low pressure compressor;
determine whether the low pressure compressor's current operating state is within a tolerance of the optimum performance target and send a signal to the actuator to rotate the at least one stator vane until the current operating state is within a tolerance of the optimum performance target; and
determine whether the low pressure compressor's current operating state is at or below one of the plurality of engine operability limit values stored in memory and send a signal to the actuator to rotate the at least one stator vane until the current operating state is at or below the one of the plurality of engine operability values stored in memory, while the current operating state is within a tolerance of the optimum performance target.

9. The gas turbine engine of claim 8 wherein the at least one stator vane includes a plurality of stator vanes circumferentially spaced around and rotatably coupled to the circular stationary case, and wherein the actuator rotates all of the stator vanes disposed along the circular stationary case simultaneously.

10. The gas turbine engine of claim 8 wherein the controller sends the signal to the actuator to rotate the at least one stator vane to reduce fuel consumption.

11. The gas turbine engine of claim 8 wherein the controller sends the signal to the actuator to rotate the at least one stator vane to reduce engine temperatures.

12. The gas turbine engine of claim 8 wherein the low pressure compressor includes a plurality of stages including a forward stage and an aft stage, wherein at least one of the stages includes a plurality of stator vanes coupled circumferentially around the case and a rotor disposed aft of the plurality of stator vanes, and the at least one of the stages includes the at least one stator vane rotatably coupled to the case and being coupled to the actuator.

13. The gas turbine engine of claim 8 wherein the low pressure compressor is coupled to a fan blade, the fan blade being upstream of the low pressure compressor.

14. The gas turbine engine of claim 8 wherein the low pressure compressor is coupled to a propeller, the propeller being upstream of the low pressure compressor.

15. A method of operating a two spool gas turbine engine using low pressure compressor variable vanes, the two spool gas turbine engine including a low pressure compressor having at least one stage that includes a ring of stator vanes that are rotatably couple to and directed radially inwardly from an endless case, the method comprising:
 calculating a current operating state of the low pressure compressor;
 determining an optimum performance target for the low pressure compressor;
 determining whether the low pressure compressor's current operating state is within a tolerance of the optimum performance target;
 sending a signal to an actuator coupled to the ring of stator vanes and rotating the stator vanes until the current operating state is within the tolerance of the optimum performance target; and
 determining whether the low pressure compressor's current operating state is at or below an engine operability limit by comparing the low pressure compressor's current operating state to one or more engine operability limit values stored in memory at a controller; and
 sending a signal to the actuator and rotating the stator vanes until the current operating state is at or below the engine operability limit, while the current operating state is within the tolerance of the optimum performance target.

16. The method of claim 15 wherein the rotating of the at least one stator vane reduces fuel consumption.

17. The method of claim 15 wherein the rotating of the at least one stator vane reduces engine temperatures.

18. The method of claim 15 further including setting a new operating state for the low pressure compressor, while the current operating state is within the tolerance of the optimum performance target and further while the current operating state is at or below the engine operability limit.

19. The method according to claim 18 wherein the method occurs during transient gas turbine engine operation.

20. The method according to claim 18 wherein the method occurs during steady-state gas turbine engine operation.

\* \* \* \* \*